US012284236B2

(12) United States Patent
Liu

(10) Patent No.: US 12,284,236 B2
(45) Date of Patent: Apr. 22, 2025

(54) MEDIA SHARING SYSTEM

(71) Applicant: Magic Control Technology Corporation, New Taipei (TW)

(72) Inventor: Pei-Chung Liu, New Taipei (TW)

(73) Assignee: Magic Control Technology Corporation, New Taipei (TW)

( * ) Notice: Subject to any disclaimer, the term of this patent is extended or adjusted under 35 U.S.C. 154(b) by 0 days.

(21) Appl. No.: 18/103,549

(22) Filed: Jan. 31, 2023

(65) Prior Publication Data

US 2023/0291778 A1 Sep. 14, 2023

(30) Foreign Application Priority Data

Mar. 9, 2022 (TW) .................................. 111108650

(51) Int. Cl.
| | |
|---|---|
| *H04L 65/611* | (2022.01) |
| *G06F 3/023* | (2006.01) |
| *G06F 3/16* | (2006.01) |

(52) U.S. Cl.
CPC ............ *H04L 65/611* (2022.05); *G06F 3/023* (2013.01); *G06F 3/16* (2013.01)

(58) Field of Classification Search
CPC .......... H04L 65/611; G06F 3/023; G06F 3/16; G06F 3/0227; G06F 3/1423; G06F 3/1454; H04N 21/43637; H04N 21/8547
See application file for complete search history.

(56) References Cited

U.S. PATENT DOCUMENTS

| | | | |
|---|---|---|---|
| 9,317,101 B2 | 4/2016 | Narayan | |
| 2011/0045816 A1* | 2/2011 | Wang | G09B 17/006 |
| | | | 455/420 |
| 2013/0046907 A1* | 2/2013 | Liu | G06F 3/0227 |
| | | | 710/73 |

(Continued)

FOREIGN PATENT DOCUMENTS

| | | |
|---|---|---|
| TW | I539797 B | 6/2016 |
| TW | I756008 B | 2/2022 |

OTHER PUBLICATIONS

European search Report of European Application No. 23153385.2-1208.

(Continued)

*Primary Examiner* — Jungwon Chang
(74) *Attorney, Agent, or Firm* — Millen, White, Zelano & Branigan P.C.; William F. Nixon

(57) ABSTRACT

A media sharing system includes at least two computing devices each having a wireless module for a bidirectional transmission of media data of a displayed image, an input message, a cursor, and a sound, and including: at least one display service block receiving and processing the displayed image from the wireless module; at least one sound service block receiving or outputting a sound signal from or to a controlling side computing device and a controlled side computing device to carry out the sound processing and broadcasting; at least one input device; and at least one input device service block connected to the input device, so as to allow the input device to be activated to issue an activation signal. The input device service block receives an input signal of the input device included in the controlling and controlled side computing devices so as to perform a display-related function.

6 Claims, 3 Drawing Sheets

(56) References Cited

U.S. PATENT DOCUMENTS

| | | | | |
|---|---|---|---|---|
| 2013/0234913 | A1* | 9/2013 | Thangadorai | G06F 3/1423 345/2.1 |
| 2013/0238702 | A1* | 9/2013 | Sheth | G06F 3/1454 709/204 |
| 2014/0028726 | A1* | 1/2014 | Dave | G06F 3/1438 345/660 |
| 2015/0062001 | A1* | 3/2015 | Song | A63F 13/235 345/156 |
| 2016/0316259 | A1* | 10/2016 | Kambhatla | H04N 21/44227 |
| 2020/0169774 | A1* | 5/2020 | Gong | H04N 21/43637 |
| 2021/0344671 | A1 | 11/2021 | Chiang et al. | |
| 2023/0130611 | A1* | 4/2023 | Li | H04N 21/8547 725/80 |

OTHER PUBLICATIONS

Search report in corresponding Tw Application No. 111108650 dated Nov. 24, 2022 (pp. 1-6) and english translation thereof (1 page).

* cited by examiner

MEDIA SHARING SYSTEM

CROSS-REFERENCE TO RELATED APPLICATION

This application claims the priority of Taiwanese patent application No. 111108650, filed on Mar. 9, 2022, which is incorporated herewith by reference.

BACKGROUND OF THE INVENTION

1. Field of the Invention

The present invention relates to a media sharing system, and in particular to a system that is applicable to sharing media data, such as a displayed image, an input message, a cursor, and a sound, between at least two computing devices and comprises an input device for activating switching of positions between a controlling side computing device and a controlled side computing device.

2. The Prior Arts

A conventional connection architecture between computing devices is only limited to transmission of data. A bulky, complicated and expensive server network must be adopted for transmitting and sharing media data of a displayed image, an input message, a cursor, a sound, etc. from one computing device to another computing device. This requires a high system cost and complicated construction of network. Further, interactive operation of the media data of the displayed image, the input message, the cursor, the sound, etc. between the computing devices may only be executed through servers. This makes the interactive operation very difficult and may only be realized through additionally adopted server resources since the existing hardware resources of the computing devices are not fully used and shared. Apparently, this is economically inefficient.

The conventional connection way between the computing devices for transmitting the displayed image, the input message, the cursor, and the sound requires expensive servers and complicated network structure, thereby causing the problem of a higher system cost and a complicated network engineering construction.

SUMMARY OF THE INVENTION

An objective of the present invention is to provide a media sharing system, comprising: at least two computing devices, each of the computing devices having a wireless module to provide a bi-directional transmission of media data of a displayed image, an input message, a cursor, and a sound through wireless communication, and one computing device of the at least two computing devices generating an activation signal transmitted to a controlling side of the at least two computing devices to switch the controlling side and a controlled side of the computing devices, wherein the controlling side computing device controls other controlled side computing devices through the transmitted media data, and wherein each of the computing devices includes at least one display service block, which receives the displayed image outputted from the wireless module to process the displayed image; at least one sound service block, which receives a sound signal inputted from or outputs the sound signal to the controlling side computing device and the controlled side computing device to carry out the sound processing and broadcasting; at least one input device; and at least one input device service block, wherein the input device is connected to the input device service block, so as to allow the input device to be activated to issue the activation signal that is transmitted through the input device service block, the input device service block receives an input signal of the input device included in the controlling side computing device and the controlled side computing device so as to perform a display-related function.

According to an embodiment of the present invention, the display service block includes at least one system graphic service module, which receives the displayed image outputted from the wireless module so as to process the displayed image and supply a displayed image signal to physical display drivers of the controlling side computing device and the controlled side computing device so that the physical display drivers supply the image displaying signal to a respective display device for displaying therein; and at least one virtual display driver, which is connected to the system graphic service module to receive the displayed image from the system graphic service module and convert the displayed image into the displayed image signal to be transmitted back to the system graphic service module.

According to an embodiment of the present invention, the input device service block includes: at least one driver, which is connected to the input device of the controlling side computing device and the controlled side computing device to receive the input signal; at least one filter, which is connected to the driver to filter the input signal; and at least one human machine interface service module, which is connected to the filter to receive and process the filtered input signal, the human machine interface service module configured to supply the data of the input message of the input device and the cursor.

According to an embodiment of the present invention, the sound service block includes: at least one sound interface service module, which is connected to at least one sound broadcasting device and a sound input device, so that the sound interface service module transmits a sound effect signal to be broadcasted to the sound broadcasting device for broadcasting or the sound input device transmits the inputted sound signal to the sound interface service module; and at least one audio service module, which is connected to the sound interface service module to process the data of the sound effect signal to be outputted or the inputted sound signal and transmit the data of the sound effect signal to the sound interface service module to drive the sound broadcasting device for broadcasting sound, or to allow the audio service module to receive the data of the sound signal inputted from the sound input device to the sound interface service module. The at least one audio service module which is connected to an application program of the controlling side computing device and the controlled computing device processes the data of the sound signal to be shared and broadcasted from the wireless module and then carries out sound broadcasting. The at least one audio service module which is connected to the application program of the controlling side computing device and the controlled side computing device intercepts the data of the sound signal inputted from the sound service block or sound input data or sound output data of the computing device in order to allow the controlling side computing device and the controlled side computing device to carry out sharing and transmission of the sound input data or the sound output data through the wireless module, or to allow the audio service module to carry out sound broadcasting.

According to an embodiment of the present invention, the input device is a hotkey.

According to an embodiment of the present invention, the input device is an application program of inserted dialog box.

The advantageous effect of the media sharing system according to the present invention is that a wireless module that has a low cost and simple structure is provided for connecting at least two computing devices so as to perform a bi-directional transmission of media data of a displayed image, an input message, a cursor, and a sound through wireless communication. The computing devices are directly connected by a switching control module to allow the computing devices to do bi-directional transmission and sharing of the media data of the displayed image, the input message, the cursor, and the sound. The most importantly inventive idea is that the hardware resources of the computing devices are allowed to share execution, broadcasting, and processing of the media data of the displayed image, the input message, the cursor, and the sound so that the resources of the computing device can be effectively saved. The drawbacks of the conventional computing devices that cannot transmit, share, broadcast, and execute the media data without installation of a server system can be overcome. The present invention provides an input device that can be easily operated to activate switching between a controlling side and a controlled side of the computing devices so as to realize a substantial improvement of economic efficacy.

DETAILED DESCRIPTION OF THE PREFERRED EMBODIMENT

Figure 1:
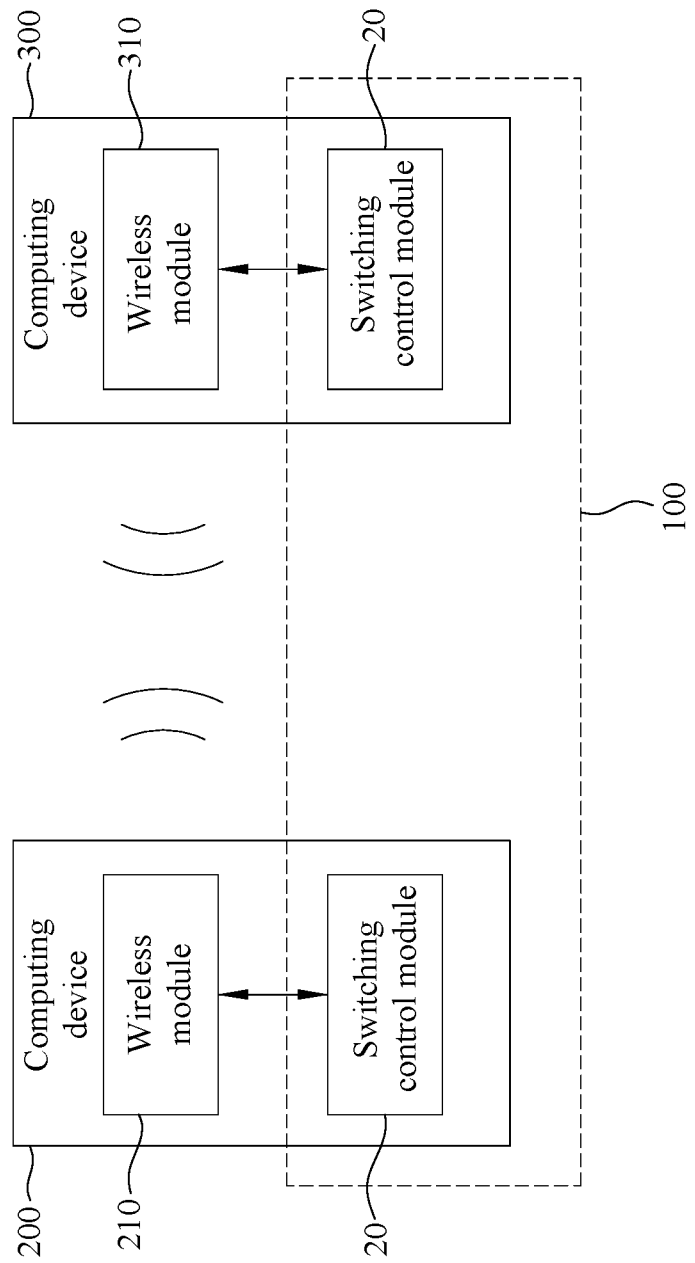
FIG. 1 is a schematic block diagram illustrating a media sharing system according to the present invention.

Please refer to FIG. 1, which is a schematic block diagram illustrating a media sharing system according to the present invention. As shown in FIG. 1, the media sharing system 100 performs wireless communication, which is not limited to any specific configuration, to correspondingly connect a wireless module 210 of a computing device 200 and a wireless module 310 of another computing device 300, so that the computing devices 200 and 300 may carry out a bi-directional transmission of media data of a displayed image, an input message, a cursor, and a sound.

Figure 2A:
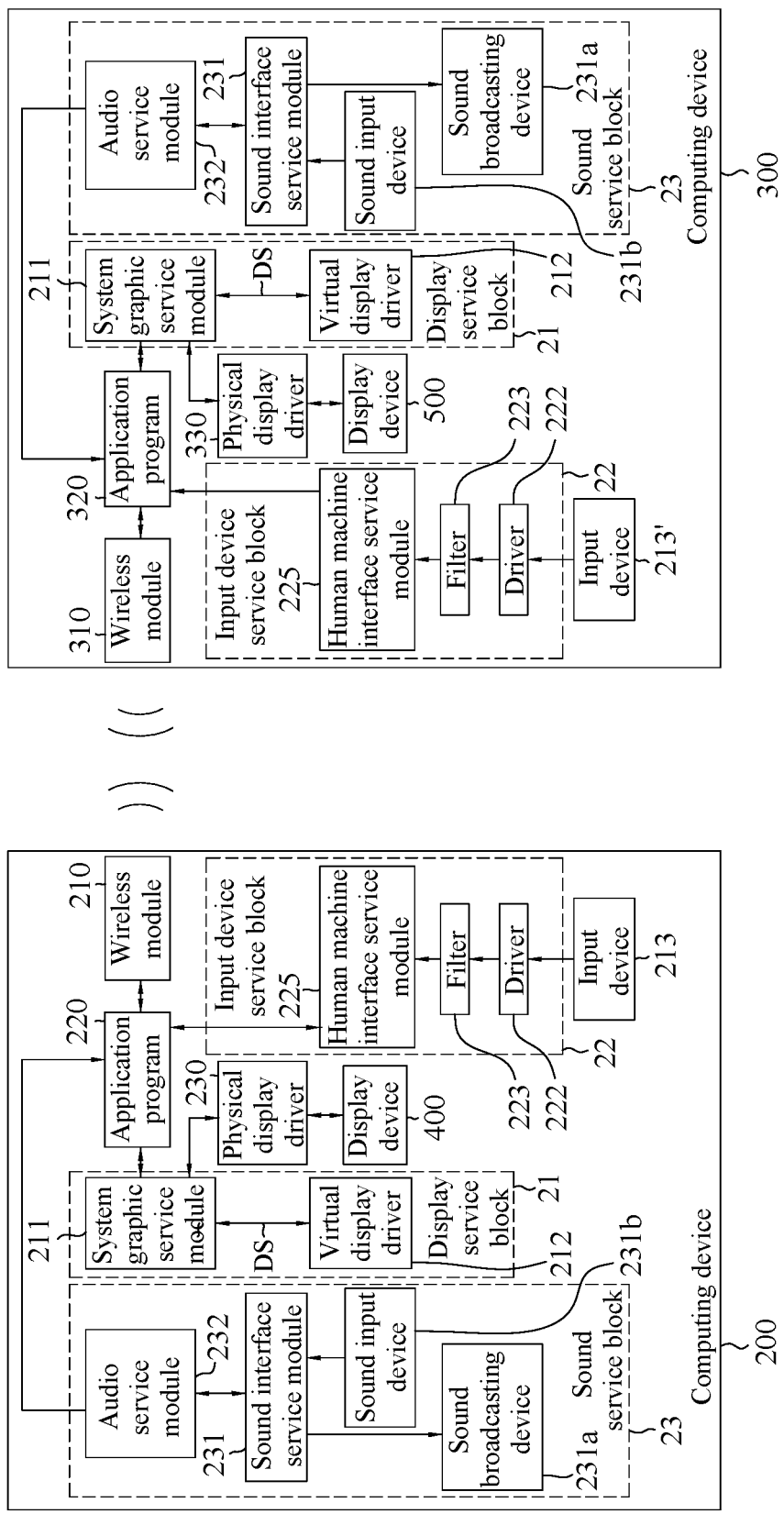
FIG. 2A is a block diagram illustrating a media sharing system according to an embodiment of the present invention.
Figure 2B:
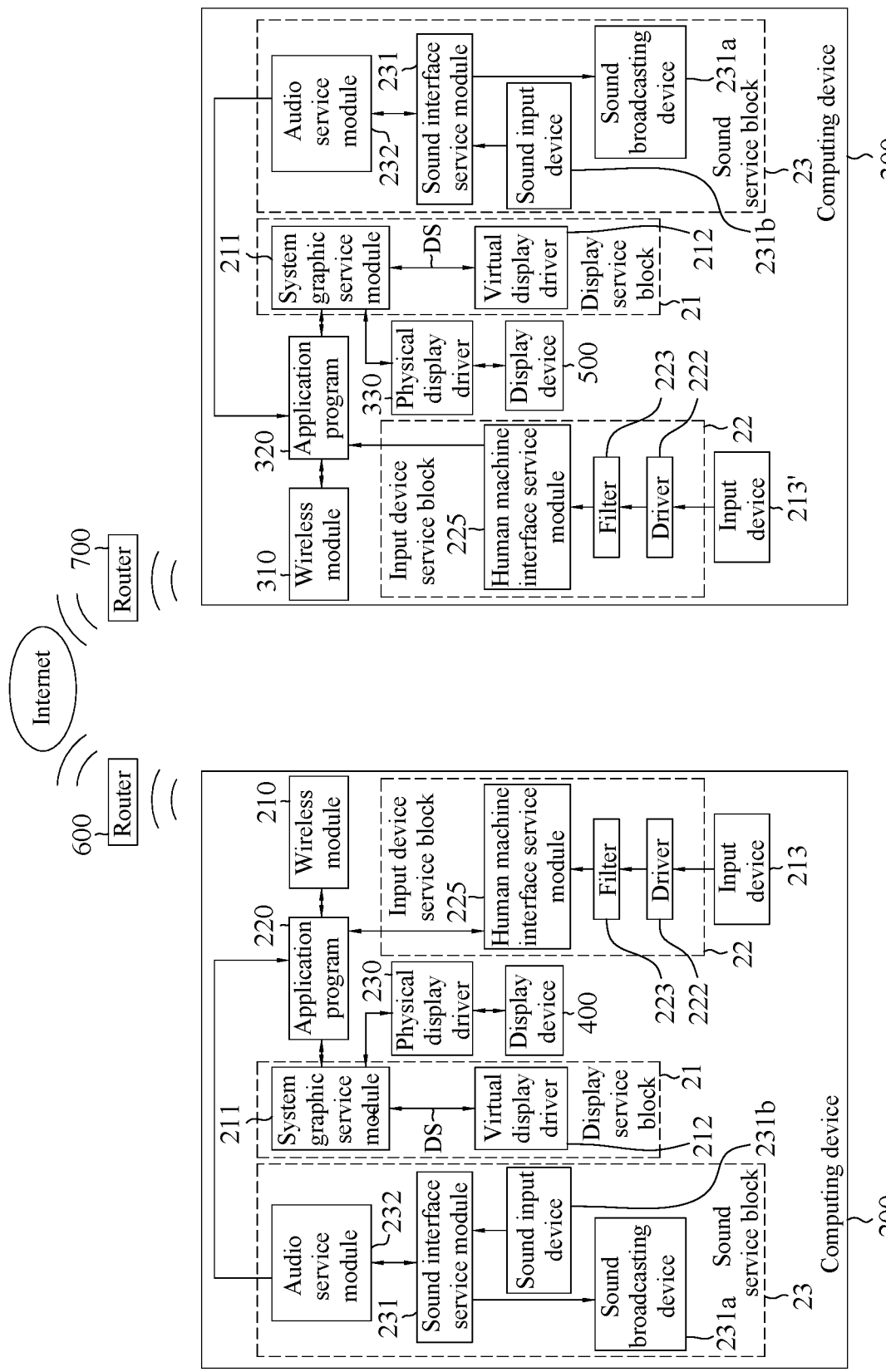
FIG. 2B is a block diagram illustrating a media sharing system according to another embodiment of the present invention.

Please refer to FIG. 2A, which is a block diagram illustrating a media sharing system according to an embodiment of the present invention. At least one pair of switching control modules 20 in FIG. 1 respectively connects the computing devices 200 and 300. As shown in FIG. 2, each switching control module 20 includes at least one display service block 21, an input device service block 22, a sound service block 23, and an input device 213. The display service block 21 further includes at least one system graphic service module 211 and at least one virtual display driver 212. The system graphic service modules 211 are respectively connected to an application program 220 of the computing device 200 and an application program 320 of the computing device 300 to receive data of displayed images from the wireless modules 210 and 310 in order to take processing of the data of the displayed image and issue a displayed image signal DS to a physical display driver 230 of the computing device 200 and a physical display driver 330 of the computing device 300, whereby the physical display driver 230 and 330 respectively transmit the image displaying signals DS to display devices 400 and 500 for displaying therein. Please refer to FIG. 2B, which is a block diagram illustrating a media sharing system according to another embodiment of the present invention. The difference between FIG. 2A and FIG. 2B is that the wireless module 210 of the computing device 200 and the wireless module 310 of the computing device 300 in FIG. 2B are connected with each other respectively by routers 600 and 700 through an internet.

The virtual display driver 212 is connected to the system graphic service module 211 to receive the data of the displayed image from the system graphic service module 211 and convert the data of the displayed image into the displayed image signal DS to be transmitted back to the system graphic service module 211.

The input device service block 22 includes a driver 222, a filter 223, a human machine interface service module 225. The driver 221 connects an input device 213 of the computing device 200 and an input device 213' of the computing device 300 to receive an input signal. The filter 223 is connected to the driver 222 to take a filtering operation on the input signal, and the human machine interface service modules 225 is connected to the filter 223 to receive and process the filtered input signal to supply control instructions of the input device and the data of the cursor.

The sound service block 23 includes at least one sound interface service module 231 and an audio service module 232. The sound interface service module 231 is connected to at least one sound broadcasting device 231a and a sound input device 231b. The sound broadcasting device 231a is not limited to any specific configuration and type and a speaker is taken as an example in the present invention. The sound input device 231b is not limited to any specific configuration and type and a microphone is taken as an example in the present invention. Thus, the sound interface service module 231 transmits a sound effect signal to be broadcasted to the sound broadcasting device 231a for broadcasting sound, or the sound input device 231b transmits a sound signal to the sound interface service module 231.

The audio service module 232 is connected to the sound interface service module 231 to process the data of the sound effect signal to be outputted or the data of the sound signal to be inputted and transmit the output data of the sound effect signal to the sound interface service module 231 to allow the sound interface service module 231 to drive the sound broadcasting device 231a for broadcasting sound, or the audio service module 232 receives the data of the sound signal inputted from the sound input device 231b to the sound interface service module 231.

The audio service module 232 connected to an application program 220 of the computing device 200 and an application program 320 of the computing device 300 receives and processes the data of the sound signal to be shared and broadcasted from the wireless module 210 and 310 and then carries out sound broadcasting.

The audio service module 232 connected to the application program 220 of the computing device 200 and the application program 320 of the computing device 300 intercepts the data of the sound signal inputted from the sound service block 23 or sound input data or sound output data from the computing devices 200 and 300 so that the application programs 220 and 320 may carry out sharing and transmission of the sound input data or the sound output data through the wireless module 210 and 310, or to allow the audio service modules 232 to carry out sound broadcasting.

The input devices 213 and 213' are not limited to any specific configuration and type, and may include a keyboard, a mouse, a touch panel, a stylus, a hot key, or an application program of inserted dialog box. The input device 213 is activated to issue an activation signal that is transmitted through the input device service block 22.

The display service block 21, the input device service block 22, the sound service block 23, or the input device 213 of the switching control module 20 may be of hardware implementation or alternatively be implemented in the form of software loaded in the computing devices 200 and 300.

In an initial condition where the computing device 200 is a controlling side, while the computing device 300 is a controlled side, the data of the displayed image, the input message, the cursor, and the sound of the computing device 200 is transmitted, by wireless communication, to the switching control module 20 of the computing device 300 to allow the display service block 21 of the switching control module 20 to process the data of the displayed image, the input message, the cursor and the sound, so that the display device 500 of the computing device 300 displays the data of the displayed image, the input message, the cursor and the sound transmitted from the computing device 200. Further, the input device service block 22 of the switching control module 20 of the computing device 300 processes the input message transmitted from the input device of the computing device 200 to allow the input message of the input device and a cursor position to be shown on the displayed image so that the displayed image on the display device 500 of the computing device 300 may show the operation statuses of the input device and the cursor of the computing device 200. Further, the sound service block 23 of the switching control module of the computing device 300 processes the sound input data and sound output data transmitted from the computing device 200 to allow the sound broadcasting device 231a of the computing device 300 to broadcast the sound input or sound output data supplied from the computing device 200 so as to achieve sharing of the media data, such as the displayed image, the input message, the cursor, and the sound, of the computing device 200 by the computing device 300.

As mentioned above, in a case that multiple computing devices are connected in communication, when any one of the multiple computing devices intends to be the controlling side, it can be activated by the input device of the switching control module 20 of the one computing device to generate an activation signal transmitted to an application program thereof, so that the application program can obtain a function of the controlling side, whereby it can execute the controlling function of the controlling side computing device 200 as described above, and the activation signal may be transmitted to the application programs of other computing devices, so that the other computing devices become the controlled side computing devices, thereby performing the function of the controlled side computing device 300 as described above. In addition, the controlling side computing device 200 becomes a controlled side computing device same as the controlled side computing device 300, which may share the media data, such as the displayed screen, the input message, the cursor, and the sound, of the one computing device on the controlling side as described above.

The above-mentioned computing devices 200 and 300 share the displayed screen, the input message, the cursor or the sound with each other. The displayed screen, the input message, the cursor or the sound are not necessarily the real-time displayed image, the input message, the cursor or the sound of the controlling side computing device 200 or 300, but it can be another displayed image, input message, cursor or sound specified by the controlling side computing device 200 or 300 according to user needs. The controlled side computing device 300 or 200 can be used as another extended displaying device or sharing device of the output and input media data.

It should be noted that the application of the media sharing system 100 of the present invention is not limited to a one-to-one connection between the computing devices 200 and 300, but also a multiple-to-one connection.

In summary, the various drawings and descriptions listed in the media sharing system of the present invention are for explaining the technical content of the present invention, and the enumerated embodiments are not intended to limit the scope of the present invention. All equivalent variations and replacements of steps, procedures or elements of the present invention belong to the scope of the present invention, and its scope will be defined by the following claims.

The present invention is not limited to the above-described embodiments, and it is obvious to those skilled in the art that various modifications and variations can be made to the present invention without departing from the spirit or scope of the present invention.

Thus, the present invention covers modifications and variations made to this invention or to fall within the scope of the appended claims and the equivalents.

What is claimed is:

1. A media sharing system, comprising:
a plurality of computing devices, each of the computing devices having a wireless module to provide a bi-directional transmission of media data of a displayed image, an input message, a cursor, and a sound through wireless communication, one of the plurality of computing devices being functioned as a controlling side computing device and a remaining of the plurality of computing devices being functioned as controlled side computing devices, and each of the plurality of computing devices further comprising a switching controller for switching controlling/controlled functions between the plurality of computing devices,
wherein all of the controlled side computing devices are configured to be able to be switched to the controlling side computing device, so as to control all of the computing devices,
wherein, when intended, one of the plurality of controlled side computing devices generates an activation signal transmitted wirelessly to the controlling side computing device to switch a controlling function between the controlling side computing device and the one of the controlled side computing devices,
wherein the controlling side computing device controls other controlled side computing devices through the transmitted media data,
wherein the switching controller of each of the plurality of computing devices includes at least one display service block, which receives the displayed image outputted from the wireless module to process the displayed image; at least one sound service block, which receives a sound signal inputted from or outputs the sound signal to the controlling side computing device and the controlled side computing device to carry out the sound processing and broadcasting; at least one input device; and at least one input device service block, and wherein the input device is connected to the input device service block, so as to allow the input device to be activated to issue the activation signal that is transmitted through the input device service block, the input device service block receives an input signal of the input device included in the controlling side computing device and the controlled side computing device so as to perform a display-related function.

2. The media sharing system as claimed in claim 1, wherein the display service block includes at least one system graphic service module, which receives the displayed image outputted from the wireless module so as to process the displayed image and supply a displayed image signal to physical display drivers of the controlling side computing device and the controlled side computing device so that the physical display drivers supply the image displaying signal to a respective display device for displaying therein; and at least one virtual display driver, which is connected to the system graphic service module to receive the displayed image from the system graphic service module and convert the displayed image into the displayed image signal to be transmitted back to the system graphic service module.

3. The media sharing system as claimed in claim 1, wherein the input device service block includes: at least one driver, which is connected to the input device of the controlling side computing device and the controlled side computing device to receive the input signal; at least one filter, which is connected to the driver to filter the input signal; and at least one human machine interface service module, which is connected to the filter to receive and process the filtered input signal, the human machine interface service module configured to supply the data of the input message of the input device and the cursor.

4. The media sharing system as claimed in claim 1, wherein the sound service block includes: at least one sound interface service module, which is connected to at least one sound broadcasting device and a sound input device, so that the sound interface service module transmits a sound effect signal to be broadcasted to the sound broadcasting device for broadcasting or the sound input device transmits the inputted sound signal to the sound interface service module; and at least one audio service module, which is connected to the sound interface service module to process the data of the sound effect signal to be outputted or the inputted sound signal and transmit the data of the sound effect signal to the sound interface service module to drive the sound broadcasting device for broadcasting sound, or to allow the audio service module to receive the data of the sound signal inputted from the sound input device to the sound interface service module, wherein the at least one audio service module which is connected to an application program of the controlling side computing device and the controlled side computing device processes the data of the sound signal to be shared and broadcasted from the wireless module and then carries out sound broadcasting; and wherein the at least one audio service module which is connected to the application program of the controlling side computing device and the controlled side computing device intercepts the data of the sound signal inputted from the sound service block or sound input data or sound output data of the computing device in order to allow the controlling side computing device and the controlled side computing device to carry out sharing and transmission of the sound input data or the sound output data through the wireless module, or to allow the audio service module to carry out sound broadcasting.

5. The media sharing system as claimed in claim 1, wherein the input device is a hot key.

6. The media sharing system as claimed in claim 1, wherein the input device is an application program of inserted dialog box.

* * * * *